(12) United States Patent
Prestigiacomo

(10) Patent No.: US 11,263,535 B2
(45) Date of Patent: Mar. 1, 2022

(54) ASSOCIATIVE RELEVANCY KNOWLEDGE PROFILING ARCHITECTURE, SYSTEM, METHOD, AND COMPUTER PROGRAM PRODUCT

(71) Applicant: Araicom Research LLC, Baton Rouge, LA (US)

(72) Inventor: Anthony Prestigiacomo, Baton Rouge, LA (US)

(73) Assignee: ARAICOM RESEARCH LLC, Baton Rouge, LA (US)

( * ) Notice: Subject to any disclaimer, the term of this patent is extended or adjusted under 35 U.S.C. 154(b) by 1151 days.

(21) Appl. No.: 15/391,147

(22) Filed: Dec. 27, 2016

(65) Prior Publication Data

US 2017/0109635 A1    Apr. 20, 2017

Related U.S. Application Data

(63) Continuation of application No. 14/554,575, filed on Nov. 26, 2014, now Pat. No. 9,530,097, which is a continuation of application No. 12/597,286, filed as application No. PCT/US2008/060984 on Apr. 21, 2008, now Pat. No. 8,914,318.

(60) Provisional application No. 60/913,929, filed on Apr. 25, 2007.

(51) Int. Cl.
| *G06N 5/04* | (2006.01) |
| *G06F 16/9535* | (2019.01) |
| *G06N 5/02* | (2006.01) |
| *G06F 16/33* | (2019.01) |

(52) U.S. Cl.
CPC .......... *G06N 5/04* (2013.01); *G06F 16/9535* (2019.01); *G06N 5/02* (2013.01); *G06N 5/022* (2013.01); *G06F 16/3338* (2019.01)

(58) Field of Classification Search
CPC ....................................................... G06N 5/02
USPC ........................................... 706/47; 707/776
See application file for complete search history.

(56) References Cited

U.S. PATENT DOCUMENTS

| 5,499,340 A | 3/1996 | Barritz |
| 6,094,650 A | 7/2000 | Stoffel et al. |
| (Continued) | | |

OTHER PUBLICATIONS

Chevalier et al ("A Profile-Based Architecture for a Flexible and Personalized Information Access" 2004) (Year: 2004).*

(Continued)

*Primary Examiner* — Lut Wong
(74) *Attorney, Agent, or Firm* — Alston & Bird LLP

(57) ABSTRACT

Provided are architectures, system, methods, and computer program products that provide a user with the ability to define an association of data and/or information from known reference sets perceived by the user as relevant to a subject matter domain, thereby imparting and formalizing some of the user's knowledge about the domain. An associative relevancy knowledge profiler may also allow a user to create a profile by modifying or restricting the known reference sets and windowing the results from the association as a user might refine any other analysis algorithms. An associative relevancy knowledge profiler may also be used to define a user profile used by the user and others. A user profile may be usable in various manners depending upon, for example, rights management permissions and restrictions for a user.

18 Claims, 5 Drawing Sheets

(56) References Cited

U.S. PATENT DOCUMENTS

| | | | |
|---|---|---|---|
| 6,115,709 A * | 9/2000 | Gilmour | G06F 21/6245 |
| | | | 706/50 |
| 6,233,609 B1 | 5/2001 | Mittal | |
| 2004/0010483 A1 | 1/2004 | Brands et al. | |
| 2004/0015464 A1 | 1/2004 | Ii et al. | |
| 2006/0112029 A1 | 5/2006 | Estes | |
| 2013/0024295 A1 | 1/2013 | Shkedi | |

OTHER PUBLICATIONS

Chen et al ("Empowering Resource Providers to Build the Semantic Grid") (Year: 2004).*
Summons to Attend Oral Proceedings from European Patent Application No. 07746411.1 dated Feb. 15, 2019.
Bekhuis, T., Conceptual Biology, Hypothesis Discovery, and Text Mining: Swanson's Legacy, Biomedical Digital Libraries, vol. 3, No. 1, (Apr. 2006) 7 pages (XP021019206).
International Preliminary Report on Patentability (Chapter II) for International Application No. PCT/US08/60984 dated Oct. 2, 2009.
International Search Report and Written Opinion for International Application No. PCT/US08/60984 dated Jul. 2, 2008.
Lee, D. L. et al., Document Ranking and the Vector-Space Model, IEEE Software, Institute of Electrical and Electronics Engineering, vol. 14, No. 2 (Mar. 1997) 67-75 (XP-002423629).
Limbu et al.; "Contextual Relevance Feedback in Web Information Retrieval"; Oct. 2005.
Notice of Allowance from Canadian Patent Application No. 2,684,892 dated Feb. 15, 2017.
Office Action from Canadian Patent Application No. 2,684,892 dated Feb. 24, 2016.
Office Action from Canadian Patent Application No. 2,684,892 dated Jan. 15, 2015.
Pratt, W. et al., LitLinker: Capturing Connections Across the Biomedical Literature, Proceedings of the International Conference on Knowledge capture, K-CAP '03 (Jan. 2003) 8 pages (XP055181608).
Stegman, J. et al., Hypothesis Generation Guided by Co-Word Clustering, Scientometrics, vol. 56, No. 1 (2003) 111-135 (XP055181621).
Supplementary European Search Report for Application No. EP 08 74 6411 dated Apr. 20, 2015.
Weeber, M. et al., Text-Based Discovery in Biomedicine: The Architecture of the DAD-System, AMIA Annual Symposium, A Conference of the American Medical Informatics Association (Jan. 2000) 5 pages (XP-002460118).

* cited by examiner

ASSOCIATIVE RELEVANCY KNOWLEDGE PROFILING ARCHITECTURE, SYSTEM, METHOD, AND COMPUTER PROGRAM PRODUCT

CROSS REFERENCE TO RELATED APPLICATIONS

This application is a continuation of U.S. pre-grant application Ser. No. 14/554,575, now U.S. Pat. No. 9,530,097, filed Nov. 26, 2014, which is a continuation of U.S. pre-grant application Ser. No. 12/597,286, now U.S. Pat. No. 8,914,318, filed Oct. 23, 2009, which is a national phase entry of International Application No. PCT/US/2008/060984, filed Apr. 21, 2008, which claims the benefit of U.S. Provisional Patent Application No. 60/913,929, filed Apr. 25, 2007. The entire contents of all of the above applications are incorporated herein by reference.

FIELD OF THE INVENTION

Embodiments of the present invention relate generally to information retrieval systems and, more particularly, to knowledge profiling architectures permitting capture and use of associations between known reference sets, and related systems, methods, and computer program products.

BACKGROUND

Many different types of data and information are available such as text, articles, lists, and graphics, and many different systems are available for recording and classifying data and information in various structure, such as a common database structure or a spreadsheet, all collectively referred to herein as data and information sources regardless of the type, system, or structure. And many different types of systems have been developed for extracting specific information from various data and information sources, collectively referred to herein as search engines, including Google® search of Google Corporation of Mountain View, Calif., Baidu search of Baidu.com Corporation of Beijing, China, Yahoo!® and AltaVista® searches of Yahoo! Corporation of Sunnyvale, Calif., MSN® and Windows Live® searches of Microsoft Corporation of Redmond, Wash., and like general searching applications; SQL and like customized searching applications; and other information retrieval (IR) systems. And even some systems have been developed for trying to infer and/or calculate information from one or more data and/or information sources, such as identifying trends in data and hypothesis generation, including inference systems, deductive reasoning systems, artificial intelligence systems, neural network systems, semantic network systems, fuzzy logic systems, and other expert systems, collectively referred to herein as inference engines.

Further, some systems allow a user to save preferences and establish preset conditions that can later be used again and/or refined for different purposes, such as a default search strategy that can be refined for various more specific searches area. Some systems are designed for particular types of data and information. And some systems are designed for a particular subject matter domain, and the corresponding operations that might be performed on the data and information available for the particular subject matter domain.

But although techniques have been developed for working with data and information, including many sophisticated search engines and inference engines, it is desirable to improve upon these existing techniques and to provide the further ability for a user to impart his or her knowledge about a domain, including to impart knowledge about a domain separate and apart from a particular search engine or inference engine. While search engines and inference engine provide exceptionally important and useful advantages, these systems, individually and in combination, are principally limited to working with, managing, and creating data and information. For example, there is a need in the art for improved architectures, systems, methods, and computer program products for providing a user with the ability to define and modify an association of data and/or information that is perceived by the user as relevant to a subject matter domain, thereby imparting some of his or her knowledge about the domain, and permitting use of that knowledge to perform discovery process operations on data and information, i.e., to evaluate data and information.

SUMMARY

In light of the foregoing background, embodiments of the present invention provide associative relevancy knowledge profiling architectures, systems, methods, and computer program products for capturing relevant associations between known reference sets as a way of capturing knowledge from a domain expert, also referred to as a subject matter expert (SME). Embodiments of the present invention are not intended to replace search engines or inference engines, but are intended to provide a separate type of technology that may be used, for example, to improve upon search engines and inference engines. Notably, embodiments of the present invention should not be confused with a search engine or inference engine, a search profile, a navigation history, or a search history. Embodiments of the present invention are a separate technology designed to provide additional capabilities and functionalities that are not known to exist, apart from or in conjunction with use in the context of a search engine or inference engine.

Embodiments of the present invention provide a user with the ability to define an association of data and/or information that is perceived by the user as relevant to a subject matter domain, thereby imparting and formalizing some of his or her knowledge about the domain. An embodiment of an associative relevancy knowledge profiler of the present invention may also allow a user to create a profile by modifying or restricting the known reference sets and windowing the results from the association as a user might refine any other analysis algorithms and for related evaluation purposes, but here the user in effectively modifying or restricting knowledge, often to improve or clarify the knowledge, or to further define the knowledge. Further embodiments of the present invention can be used to define a profile that can subsequently be used by the user who creates the profile and/or use by others. A user profile may be usable in various manners depending upon, for example, rights management permissions and restrictions for a user. For example, the original author of the profile may be permitted to revise the original profile, but another user may only be able to further restrict the original profile. Similarly, a user profile may be usable in various domains and/or with different data and information sources, such as those data sources available to a particular user. For example, an employee of a company may be able to use a profile with the data and information sources available to the company, such as proprietary data and information available to, obtained by, and/or generated by the company.

Embodiments of the present invention are provided for an associative relevancy knowledge profiling system that includes a user interface module configured to generate a user interface for presentation on a display screen and to receive user input; a known reference set module configured to provide at least two available known reference sets and to permit selection of at least two known reference sets by a selective user input received by said user interface module; an association module configured to create an association between two of said available known reference sets based upon an associative user input received by said user interface module, to generate a knowledge construct based upon said association and said two of said available known reference sets, and to generate a profile comprising said association between said two of said available known reference sets; and a storage module configured to store said profile and to provide said profile for subsequent use.

One embodiment of a system of the present invention may also include a restriction module configured to modify said profile to impose a restriction upon at least one of said two of said available known reference sets based upon a restricting user input received by said user interface module. Another embodiment of a system of the present invention may also include a preferencing module configured to modify said profile to impose a viewing preference upon any use of said profile based upon a preference user input received by said user interface module.

Embodiments of the present invention are also provided for a method of associative relevancy knowledge profiling that include providing at least two known reference sets; selecting at least two of said known reference sets up, including at least a first known reference set and a second known reference set; creating at least one association between two of said at least two of said known reference sets to generate at least part of an associative relevancy knowledge profile, wherein one of said at least one association is between said first known reference set and said second known reference set; and storing said associative relevancy knowledge profile.

One embodiment of a method of the present invention also includes inputting at least one reference set to be one of said known reference sets. Another embodiment of a method of the present invention also includes modifying said an associative relevancy knowledge profile. A further embodiment of a method of the present invention also includes selecting at least one data source to evaluate using said profile and performing a discovery process operation upon said at least one data source using said profile. Yet a further embodiment of a method of the present invention also includes storing a plurality of associative relevancy knowledge profiles to create a knowledge repository. And yet a further embodiment of a method of the present invention also includes selecting one of said profiles in said knowledge repository, to identify a selected profile; selecting at least one data source to evaluate using said selected profile; and performing a discovery process operation upon said at least one data source using said selected profile. And yet a further embodiment of a method of the present invention also includes calculating a charge for use of said selected profile or calculating a charge for performing a discovery process operation upon said at least one data source.

Embodiments of the present invention are also provided for a computer program product comprising a computer-readable storage medium having computer-readable program code portions stored therein and providing for associative relevancy knowledge profiling, the computer, the computer program product including a program code portion configured for providing at least two known reference sets; a program code portion configured for selecting at least two of said known reference sets up, including at least a first known reference set and a second known reference set; a program code portion configured for creating at least one association between two of said at least two of said known reference sets to generate at least part of an associative relevancy knowledge profile, wherein one of said at least one association is between said first known reference set and said second known reference set; and a program code portion configured for storing said associative relevancy knowledge profile.

One embodiment of a computer program product of the present invention also includes a program code portion configured for inputting at least one reference set to be one of said known reference sets. Another embodiment of a computer program product of the present invention also includes a program code portion configured for modifying said an associative relevancy knowledge profile. A further embodiment of a computer program product of the present invention also includes program code portions configured for selecting at least one data source to evaluate using said profile and for performing a discovery process operation upon said at least one data source using said profile. Yet another embodiment of a computer program product of the present invention also includes a program code portion configured for storing a plurality of associative relevancy knowledge profiles to create a knowledge repository. And yet another embodiment of a computer program product of the present invention also includes program code portions configured for selecting one of said profiles in said knowledge repository, to identify a selected profile; for selecting at least one data source to evaluate using said selected profile; and for performing a discovery process operation upon said at least one data source using said selected profile.

These characteristics, as well as additional details, of the present invention are described below. Similarly, corresponding and additional embodiments of associative relevancy knowledge profiling architectures and related systems, methods, and computer program products of the present invention are also described below.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
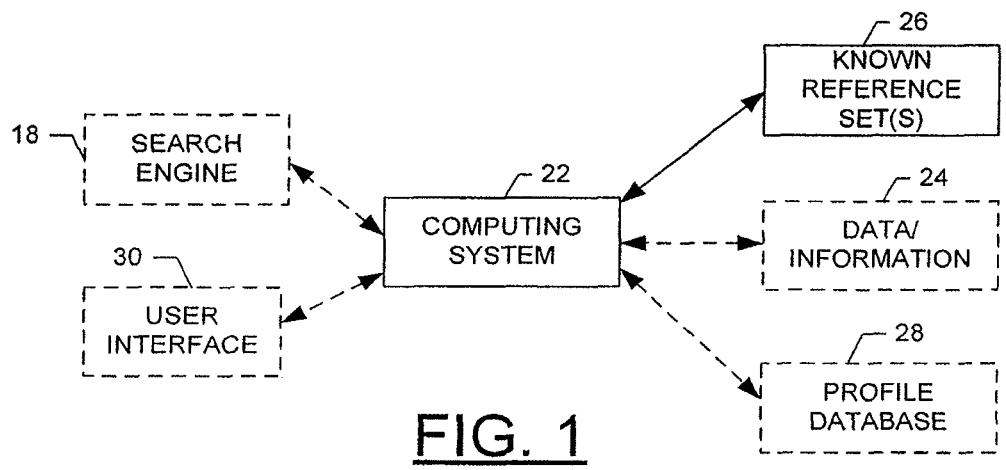
FIG. 1 is a block diagram of a framework that would benefit from embodiments of the present invention.

Embodiments of the present invention will now be described more fully hereinafter with reference to the accompanying drawings, in which some, but not all embodiments of the invention are shown. Indeed, embodiments of the present invention may be embodied in many different forms and should not be construed as limited to the embodiments set forth herein; rather, these embodiments are provided so that this disclosure will satisfy applicable legal requirements. Like reference numbers refer to like elements throughout.

It will be appreciated from the following that many types of devices may be used with the present invention, including without limitation such as devices as servers and other shared computing systems, personal computers, laptop computers, and mobile stations such as handheld data terminals and personal data assistants (PDAs). It will also be appreciated that embodiments of the present invention may be particularly useful with use in conjunction with search engines and inference engines. However, embodiments of the present invention are not limited to use applications involving search engines and inference engines, but may be employed with a variety applications related to evaluating data and/or information. Similarly, although many of the examples used herein relate to the medical and healthcare environment, it will be appreciated that embodiments of the present invention may be used with any subject matter domain, individually and also collectively with other subject matter domains.

It should also be noted that a domain need not be defined merely by subject matter, such as medicine or sports, but may also be defined by categorical distinctions and other similarities related to evaluating and analyzing the subject matter of the domain, such as a domain related to all judicial opinions authored by a particular court or by a particular judge. Further, a domain may be defined in relation to a desire to exclude certain data and information, such as a domain related to the ability to exclude adult-oriented content from the evaluation or analysis. Defining a domain merely refers to a user representing himself or herself as a domain expert for relevant associations related to the data and information represented by an related to any known reference sets; hence, embodiments of the present invention provide associative relevancy knowledge profiling architectures and related systems, methods, and computer program products.

As used herein, the terms "data" and "information" may be used independently, but collectively or independently generally refer to any type of content. Data is considered generally to be factual, often encompassing statistics with an emphasis on numerical values. And information, by comparison to data, is considered generally to not emphasize numerical values, but rather to emphasize the written word. The distinctions between what kind of content is represented by data and what kind of content is presented by information is not specifically relevant to the present invention, and, thus, any reference herein solely to data or information without a particular distinction to the exclusion of the other is intended to represent data and information collectively such that as used herein, the terms "data" and "information" may be used interchangeably to refer any type of content. However, the separate terms data and information are generally used independently to be more descriptive of various types of content and also to distinguish the content of data and information from "knowledge."

As used herein, the term "knowledge" refers to a higher order of information, or context in which to interpret information, that imparts an awareness or comprehension of a subject matter domain by a user (referred to herein as a domain expert), and is inclusive of at least one association between two known reference sets, also referred to as associative knowledge. Knowledge, as used herein, is not merely some additional piece of data or information, but is a special form of information that is generated by a domain expert through awareness and comprehension of a domain. Knowledge may be found in many forms, but is often nonfunctional, such as embedded in the form in which it is found. For example, literature typically contains some representation of knowledge as the writing is typically created with the subjective interpretation of the author. But, as embedded in the literature, the knowledge simply becomes part of the information and is nonfunctional. Embodiments of the present invention make use of knowledge that is functional, i.e., knowledge that can be represented in a profile and used for a discovery process. Embodiments of the present invention provide a vehicle in which a user can define at least some of his or her knowledge that can then be used to create, store, and further refine a fixed representation of the user's knowledge in relation to known reference sets, i.e., known subject matter of a domain. As defined and used herein, knowledge refers to associations between known reference sets. Embodiments of the present invention represent knowledge using at least one association between known reference sets premised upon a notion that knowledge is appropriately represented through the associative nature of the human interpretation of known reference sets for a domain. Different types of associations are contemplated for knowledge, including, for example, semantic enrichment such as by associating one or more elements of a known reference set with one or more elements of an external data set; cross maps; table joins; computational restrictions and like rules; fixed, linear, and non-linear computational modifications and/or algorithms; and other associations between known reference sets that imparts an awareness or comprehension of the subject matter domain by a user to permit the user to formalize his or her own conclusions, theories, anticipations, interpretations, impressions, and other preconceived notions about the domain as represented by the known reference sets and the user's associations between the known reference sets, thereby permitting the creating of a functional construct based upon the association.

As used herein, the term "known reference set" refers to a construct or organized structure of data, information, associations, or other content. Preferably, a known reference set will represent an existing dataset agreed to, understood by, and validated by peers in a particular domain, such as standards set by peer groups or organizations, but a known reference set may also be a dataset that has not been agreed to and/or validated for a particular domain, but may merely be, for example, a dataset generated by a domain expert or other user generating an associative relevancy knowledge profile. Example known reference sets include: a list of vocabularies, such as a medical dictionary; a list of identifiers and identified items, such as the ICD9 classification of diseases and injuries and corresponding codes and the ICD9 classification of procedures and corresponding codes; a list of information such as a drug directory listing ingredients of drugs; an associated list of information, such as a cross-reference chart between one classification system and another proprietary classification system; a dataset, such as Boolean or SQL search results; and a precompute data source, such as the resulting dataset from running an inference algorithm against a set of articles, the resulting data set from implementing an associative relevancy knowledge profile on an initial dataset, or any other existing or generated dataset. Different types of structures are contemplated for known reference sets, including, for example, a single level hierarchy; multiple level hierarchies such as for a lexicon, taxonomy, ontology, thesaurus, and index; a predefined associated listed information or association construct such as a cross map or table joins; and enriched and/or refined known or created reference sets such as a proprietary reference set that is a semantically enriched dataset generated by supplementing a known reference set with additional proprietary information of a company.

Further, it should be noted that embodiments of the present invention are not search engines or inference engines, but are intended to provide a separate type of system that may be used to improve upon search engines and inference engines. Although embodiments of the present invention are a separate technology designed to provide additional capabilities and functionalities that are not known to exist, it may be useful to think of an embodiment of the present invention as an add-on for improving a search engine or inference engine, or a related precursor system to using a search engine or inference engine.

Embodiments of the present invention provide advances in the general field of information retrieval by facilitating the ability for users to build a structure (profile) that represents at least some of the users knowledge and thereby allows use of the structure (profile) for use when investigating other resources (data sources). A profile (also referred to as a knowledge profile or discovery profile) provides a domain expert the ability to build an expert system that incorporates existing knowledge of the domain expert that can be used for a discovery process. A profile provides a perspective of how a domain expert views a domain and represents at least some of the knowledge of the domain expert by at least one association between two known reference sets for the domain. In addition to at least one association between two known reference sets for the domain, the perspective of a profile may include, for example, additional selections, restrictions, rankings, and other preferences they represent how the domain expert views or recommends to view the construct of an association between two known reference sets for the domain and/or the results of performing a discovery process operation upon one or more datasets using the profile. As such, a profile generally provides a perspective with both an association and how to view the association or results of the association.

Figure 2:
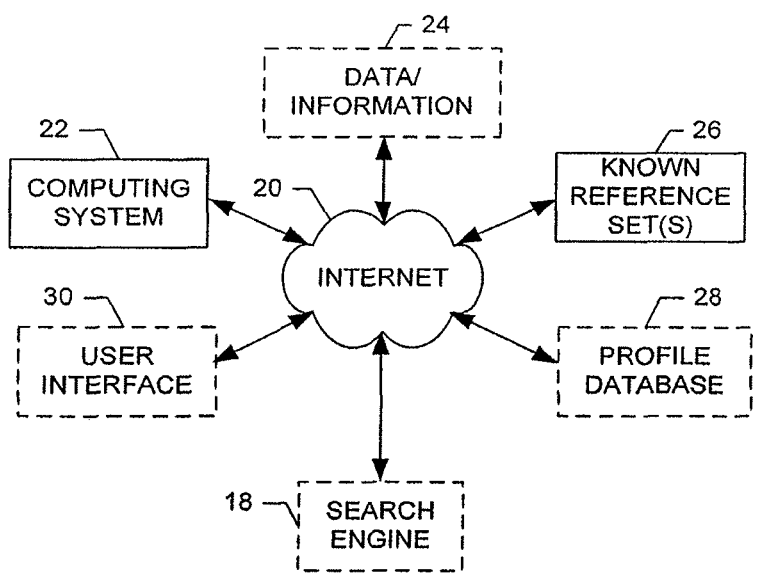
FIG. 2 is a block diagram of a network framework that would benefit from embodiments of the present invention.

Referring now to FIG. 1, a block diagram of a computing framework that would benefit from embodiments of the present invention is shown. At the center of the system is a computing system 22, such as a personal computer or server. Shown connected to the computing system 22 are several additional elements that may be separately connected to the computing system 22, interconnected by communications with the central computing system 22, were part of the computing system 22. One or more known reference sets 26 are available to the computing system 22. Data and/or information 24 representing existing content may be available to the computing system 22. A profile database 28 for storing associative relevancy knowledge profiles and referred to herein as a knowledge repository may be available to the computing system 22. A user interface 30, such as a web-based ASP interface or standalone application, may be available to the computing system 22. And a search engine 18 (or inference engine, or the like) may also be available to the computing system 22. The particular arrangements, connections, and physical localities of all of these elements are not specific to the present invention, but simply that the elements required for a specific embodiment are available to the computing system. For example, FIG. 2 is a block diagram of a network framework that would benefit from embodiments of the present invention. Unlike the diagram of FIG. 1, which is representative of a more local or direct configuration, the diagram of FIG. 2 is representative of embodiments of the present invention which rely upon a network connection such as the Internet for availability and communication between elements of the system. For example, as shown in FIG. 2, each of the elements of the system may be separately located in interconnected through the Internet 20 four substantiating an embodiment of the present invention.

Systems, methods, and computer program products of embodiments of the present invention will be primarily described in conjunction with local or direct configuration applications, such as generally represented by FIG. 1, and some networked configuration applications, such as represented in FIG. 2. It should be understood, however, that systems, methods, and computer program products of embodiments of the present invention can be utilized in conjunction with a variety of other configurations with various means of communication and connection. For example, systems, methods, and computer program products of embodiments of the present invention can be utilized in conjunction with wireline and/or wireless connections and in local/direct and networked applications. For example, wired connections may include any one or more of an Ethernet connection, a serial (RS-232) connection, a parallel (IEEE 1284) connection, a USB connection, a SCSI connection, and other means of achieving a wired or contact electronic connection capable of providing communications between two computing devices. Wireless connections may include any one or more of radio frequency (RF), Bluetooth (BT), infrared (IR, IrDA), wireless LAN (WLAN, IEEE 802.11), WiMAX (IEEE 802.16), ultra wideband (UWB, IEEE 802.15), microwave ($\mu$), ultraviolet (UV), and other means of achieving a wireless, non-contact electronic connection capable of providing communications between two computing devices. Further, network applications can be of any variety, including without limitation a Local Area Network (LAN), a Campus Area Network (CAN), a Metropolitan Area Network (MAN): a Wide Area Networks (WAN), an intranet, and an extranet.

Figure 3:
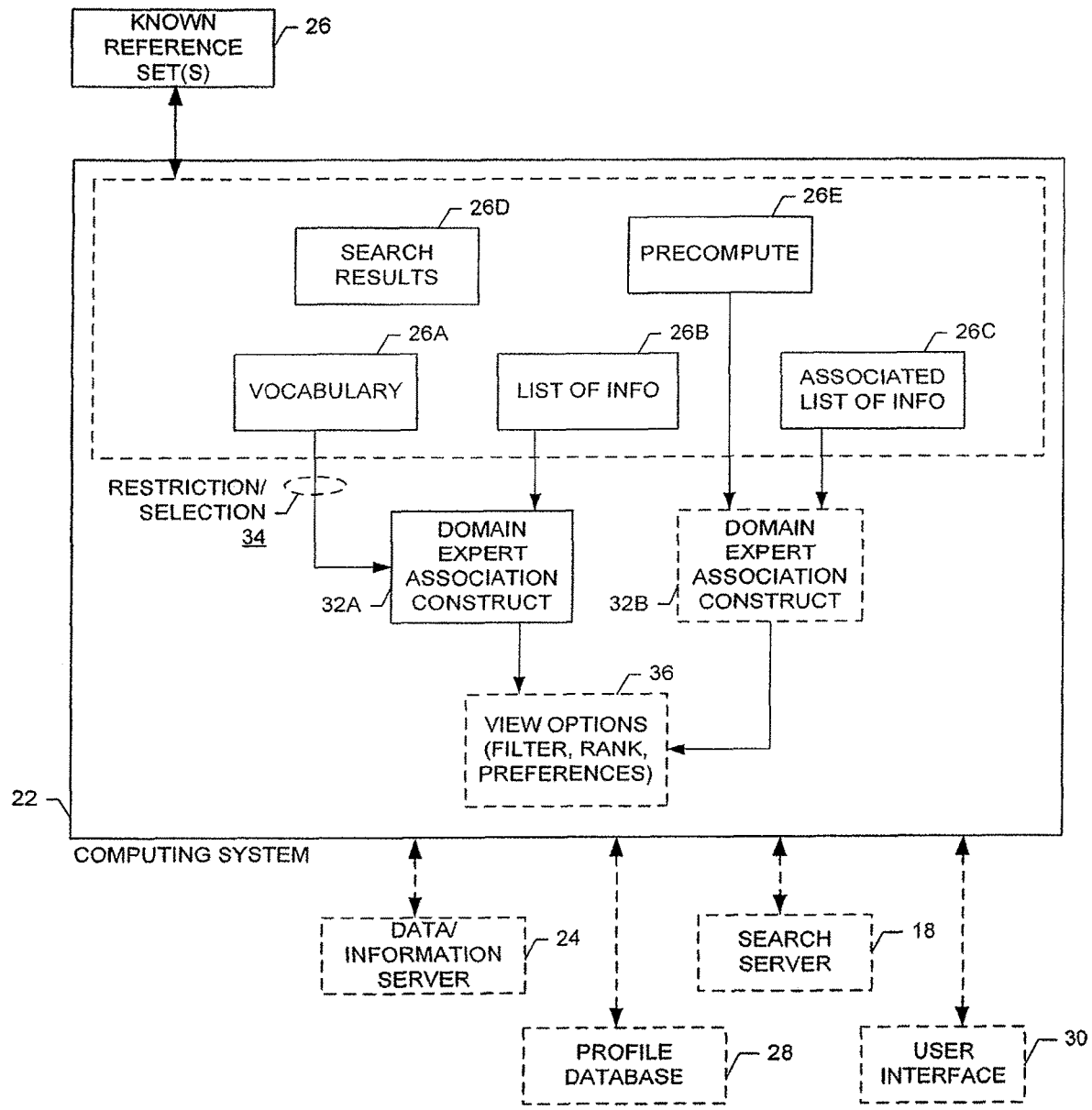
FIG. 3 is a functional block diagram of an embodiment of an associative relevancy knowledge profiling architecture of the present invention.

FIG. 3 is a functional block diagram of an embodiment of an associative relevancy knowledge profiling architecture of the present invention with the functional schematics of computing system 22 shown in detail. Embodiments of the present invention provide a tool that allows a user (domain expert) to develop an associative relevancy knowledge profile, also referred to as a knowledge discovery profile, or simply as a profile. A selection of five known reference sets 26 are shown as being included in the computing system: a vocabulary 26A, a list of information 26B, an associated list of information 26C, a set of search results 26D, and a precompute 26E. By using known reference sets, a user is able to take advantage of using a reference framework and ontologies that ordinarily are common to others in a particular domain, such that other users who might desire to use a profile created by a domain expert will be familiar with the subject matter of the known reference sets and, thus, able to examine and presumably comprehend the knowledge imparted by the domain expert about the domain. At least one association is created by a domain expert to memorialize an association between two of the known reference sets 26. The association defines an associated relationship between known reference sets as perceived by a domain expert, and as the domain expert believes may be relevant to understanding the subject matter of the domain. This provides a domain expert with the ability to impart at least some of his or her knowledge about the domain in a formalized manner that can later be used by the domain expert or others to analyze and evaluate the subject matter of the domain. For example, domain expert association construct 32A is identified as an association between the vocabulary known reference set 26A and the list of information known reference set 26B. An additional domain expert association construct 32B is identified as an association between the associated list of information known reference set 26C and the precompute known reference data set 26E.

A profile is domain dependent, at least in so far as the profile relies upon known reference sets which, at least in theory, are derived from or themselves define a domain; and preferably, a profile is created to be domain dependent such that the known reference sets, knowledge, and viewing preferences, respectfully, selected, imparted, and defined by the domain expert are designed so that the profile is particularized and effective for discovery in the domain. But a profile need not be specific to a certain subject matter of the domain, such that a domain may be exceptionally broad and inclusive of numerous subject matters. And, as noted above, a domain need not be defined merely by subject matter, such as medicine or sports, but may also be defined by categorical distinctions and other similarities related to evaluating and analyzing the subject matter of the domain or defined in relation to a desire to exclude certain data and information.

It should be noted that an aspect of the present invention, which is not apparent from the representation of FIG. 3, is the scalability or dimensionality of the associative relevancy knowledge profiling architecture. Each of the known reference sets may be considered a dimension. Thereby, the more reference sets that are included in embodiment, the higher the dimensionality of the associative relevancy knowledge profiling architecture. For example, an embodiment with only two known reference sets may be considered a two dimensional architecture, and any association construct between the two known reference sets may be thought of as the intersection of two axes (or dimensions) of the two known reference sets. Similarly, for example, an embodiment with five known reference sets, as shown in FIG. 3, may be considered a fifth dimensional architecture with possible associations between any of the five axes (or dimensions) of the five known reference sets. As such, the present invention provides a framework in which the associative relevancy knowledge profiling architecture is scalable over any number of dimensions without limitation.

As is used by convention herein throughout, an element of a figure may be shown in dashed lines representing an optional element of an embodiment of the present invention. For example, only one association is necessary for an embodiment of the present invention, so the additional domain expert association construct 32B is shown in dashed lines. However, because various embodiments the present invention may employ different capabilities and functionalities, one or more elements shown in dashed lines may be a required element of a specific embodiment of the present invention.

FIG. 3 also shows that a domain expert can modify and refine the profile being created, such as by including a restriction or selection upon one or more of known reference sets before an association is made, such as the restrictions/selection 34 shown modifying the vocabulary known reference set 26A before the domain expert creates the association 32A. For example, a known reference set may be restricted for a profile to only a desired portion of the known reference set, or a known reference set may be restricted by computationally ranking or otherwise modifying some portion of the known reference set, such as semantically enriching a portion of the known reference set.

Similarly, FIG. 3 also shows that a domain expert can also impart restrictions upon the associative relevancy knowledge profile regarding how the profile is used and the outcome of results from using the profile, as shown at block 36. This functionality is referred to herein as modifying viewing preferences or "windowing" the profile. Use of an existing profile may entail modification of the profile, such as refining a profile by editing the original profile. Modification of the profile may also involve a user (either the original domain expert or a subsequent user) enhancing a profile by adding additional knowledge to an existing profile by building upon the existing profile. Modification of the profile may also involve a user further restricting a profile, such as restrictions of a user without rights to edit the existing profile or add additional knowledge to the existing profile. A domain expert can, thus, define an association to create a construct representing knowledge, and then restrict the construct to form a reference in which to view the knowledge construct, i.e., a reference in which to view the one association between two known reference sets, or any number of associations defined for the profile. Thus, not only do embodiments of the present invention allow a user to impart knowledge into a profile to store his or her knowledge about a domain, such as knowledge to obtain desired data and information, but also to store his or her perspective on how to evaluate data and information and also to represent the results of a discovery process according to how the domain expert believes the results should may be viewed, explored, and/or evaluated. These further restrictions upon the profile may include many preferences, which might be typical for viewing any type of content, including, for example, refining search results. Viewing preferences may include, for example, rankings or biasings, filters, a selective filters, clustering, and computational clustering. Even such simple and somewhat administrative preferences may be included as part of a profile, such as the number of results that will be visible in a window, the type and/or amount of content that may be provided for a result, and even the style of the graphical user interface presenting results. In effect, a domain expert is able to formalize his or her knowledge about the domain not only by defining associations between known reference sets but also by such actions as modifying the known reference sets and modifying the manner in which a profile will operate to be used on one or more data or information sources. And, as such, a domain expert is able to add his or her human element to a profile from beginning to end because a profile is, in essence, an attempt to capture the human element as it relates to discovery based upon knowledge.

Also shown in FIG. 3 is a data/information server 24 that is connected to or in communication with computing system 22 to provide one or more data and information sources for evaluation using a profile generated by the computing system 22. As such, the data/information server 24 provides subject matter of the domain that can be analyzed according to the knowledge of a profile generated by the computing system 22. The use of a profile, by performing an operation upon one or more data and information sources using the profile, such as searching a data source, is referred to herein as a discovery process and usually refers to the evaluation and/or analysis of the one or more data sources in accordance with the knowledge of the profile. A discovery process may involve running a profile upon (over or against) a single data source or multiple data sources. For example, a user may be able to select a profile and run the profile in a discovery process over one or more of a plurality of data sources. Typically, a plurality of data/information sources may be used for performing a discovery process operation using a profile generated by the computing system 22, and, typically more than one data/information servers may be involved for providing the plurality of data/information sources.

Also connected to the computing system 22 is a profile database 28, referred to herein as a knowledge repository. An embodiment of the present invention may be used to create a knowledge repository by creating and/or storing multiple associative relevancy knowledge profiles and maintaining the profiles in storage for subsequent use, and may also involve modification/revision and/or further restriction of the stored profiles. Knowledge repositories may be created with multiple profiles for use with a single data source or for use with multiple data sources. Knowledge repositories may be created where domain experts store and publish/share their profiles for use (and/or for re-use) of their knowledge by others, such as for other researchers, other employees, or any other type or classification of users. And any variation of access management, editorial rights management, and use management may be employed for operating a knowledge repository, including, for example, such standard administrative functions as creating user accounts with defined rights management values that determine what rights a user has to view, use, modify, refine, etc. one or more profiles in the knowledge repository. For example, certain users may have access rights to access all or only a subset of the profiles stored in a knowledge repository while other users may only have access rights to access a limited subset of all of the profiles or a different subset of the profiles. Similarly, certain users may have unlimited editorial rights to modify, enhance, refine, etc. profiles stored in a knowledge repository while other users may have limited or no editorial rights. For example, those users with limited editorial rights may be restricted to use an existing profile that can only be further restricted, but cannot be modified, similar to a pre-populated search or inference template that cannot be modified. But a user with editorial rights may be able to modify an existing profile. And use of profiles may be managed in any variety of manners, including fee-based rights management such as to charge users on a transaction basis for use of profiles. And profiles may vary in cost such as where certain profiles may be free, certain profiles may have a low cost basis, and other profiles may have a high cost basis. Any one or more subscription based service arrangements may be established for an associative relevancy knowledge profiling system or a knowledge repository. In one embodiment of the present invention, a knowledge profile may be used by multiple companies to facilitate a joint venture and/or sharing of research capabilities between the companies. For example, two or more companies may share an associative relevancy knowledge profiling system that permits the two companies to each offer their respective proprietary known reference sets for use in creating profiles, which may or may not be shared between the companies. In addition, or alternatively, two or more companies may share a knowledge repository that permits the two companies to each offer their respective profiles for use by the other company to use with the company's proprietary data sources and/or with proprietary data sources of the other company.

FIG. 3 also shows a search server 18 connected to or in communication with the computing system 22. The search server 18 (i.e., search engine, inference engine, or the like) may be used for performing a discovery process operation upon one or more data and information sources using the profile. For example, a search engine may be used to search a data source using a profile according to the knowledge of the profile, rather than, for example, only using search terms and operators such as for a Boolean search. Similarly, an inference engine may be used to perform inference algorithms according to the knowledge of a profile.

And a user interface 30 is shown in FIG. 3 connected to or in communication with the computing system 22. A user interface generally is an integral software module with an associative relevancy knowledge profiling software module operating on the computing system 22, but may alternatively be separate from the computing system 22 and/or an associative relevancy knowledge profiling software module operating on the computing system 22. For example, one or more user interfaces may be provided separate from the computing system 22, such as where a company provides its own proprietary profiling user interface through the company intranet for generating profiles using an associative relevancy knowledge profiling software module operating on the computing system 22. Similarly, a knowledge repository user interface may be provided by a separate application, such as associated with a search server or other service apart from the computing system 22. A user interface 30 may be designed in any number of manners, including providing a graphical user interface (GUI) for presentation on a display screen and that receives a user input for an associative relevancy knowledge profiling system. One or more user interfaces may be designed for the creation of profiles, the maintenance and use of a knowledge repository, and use of profiles. For example, a specially designed user interface may be created that also implements additional technologies that may be similarly useful in using a profile according to an embodiment of the present invention, such as a profile use interface that also implements the ThinkMap™ visualization technology of ThinkMap Corporation of New York, N.Y., for displaying and viewing, navigating and exploring, and/or evaluating results of a discovery process.

An optional enhancement to an embodiment of the present invention may be using fixed and/or dynamic "containers" for known reference sets, associations, rules, and data sources. A container is a predefined constraint for an aspect of an associative relevancy knowledge profiling system. For example, a known reference set container may be a predefined constraint that is used with one or more known reference sets included as part of a profile. Containers may use fixed constraints, such as a constant numerical multiplier that may be used, for example, to dynamically bias a weighted importance of a known reference set. Alternatively, containers may use dynamic constraints, such as a variable numerical multiplier that may be used, for example, to bias a weighted importance of a known reference set. By using a dynamic constraint, a profile may be created that has the subsequent ability to dynamically adjust to a change in the domain, such as a change to a known reference set or any other influence on the dynamic constraint. A dynamic constraint may be updated manually, automatically, or periodically. A manual update may occur, for example, if a user selects a profile with a dynamic constraint for a container, the system alerts the user of the dynamic constraint and requesting the user to confirm or deny updating the dynamic constraint, and the user chooses to update the dynamic constraint. An automatic update may occur, for example, each time the profile is selected for use or modification. A periodic update may occur, for example, at a predefined frequency of time, such as to maintain profiles in a knowledge repository that are generally up-to-date and current for the domain, regardless whether or not the profile has been selected for use or modification, and, thus, a profile may not require further updating at the time of use or modification by a user because it is constantly (periodically) kept up to date and current for the domain. Use of fixed and dynamic constraints for containers allows a domain expert the ability to define, for example, if certain aspects of a profile are important and should change or should not change. Containers may be used with any aspect of a profile, including, for example, to constrain and/or modify a known reference set, an association, a construct from an association, or a viewing preference.

Figure 4:
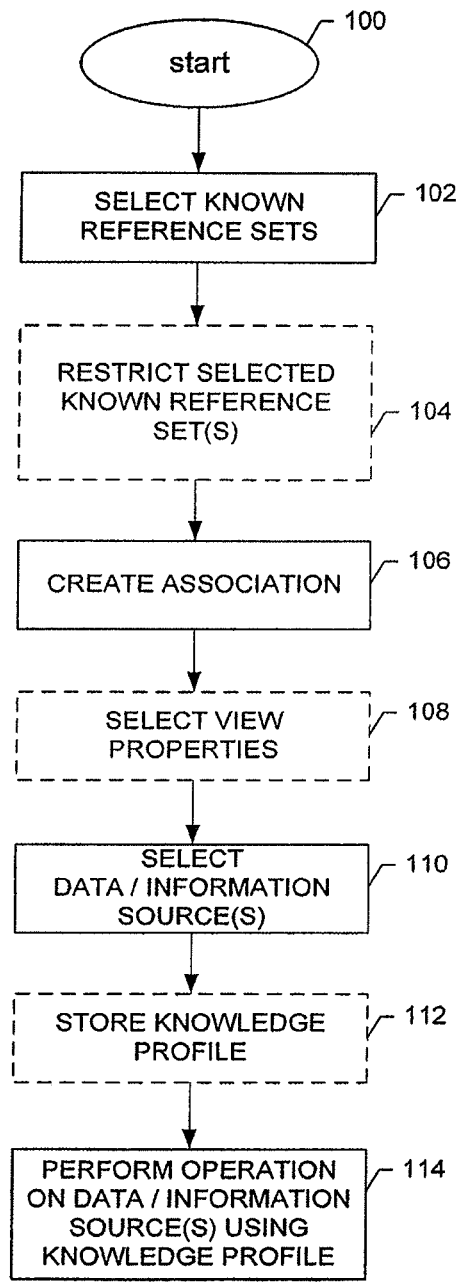
FIG. 4 is a flow diagram for performing associative relevancy knowledge profiling according to an embodiment of the present invention.

FIG. 4 is a flow diagram for performing associative relevancy knowledge profiling according to an embodiment of the present invention. Associative relevancy knowledge profiling, also referred to as the creation of a profile, is identified as starting at block 100. A user selects or chooses two or more known reference sets, as shown at block 102. Optionally, the user may further refine the profile, such as by restricting one or more of these selected known reference sets, as shown at block 104. A user and then creates at least one association between two of the known reference sets, as shown at block 106. Optionally, the user may further refine the profile, as shown at block 108 by the selecting view properties. The selection of view properties refers to any number of modifications that a user may impose upon a profile, including, for example, filters, rule sets, rankings, and other preferences that the user imposes to control the manner in which either the profile operates or the results of using the profile may be viewed. Such further refinements are intended to permit the user the ability to impart upon the profile, not only the basic structure of the users knowledge in the form of associations between known reference sets, but also the user's knowledge encompassed in the form of how the user perceives the profile should be used and/or how the user perceives the results of using the profile should be viewed. Optionally, the user may further refine the profile by pre-selecting one or more data and/or information sources that should be or are intended to be used with the profile for performing a discovery process, as shown at block 110. This may also involve identifying a particular type of required or intended discovery process for the profile, potentially even to the extent of identifying a required or intended system (search engine or inference engine) to perform the discovery process on the one or more data and/or information sources using the profile. Typically, an embodiment of present invention will permit the user to store the profile, as shown at block 112, such as in a knowledge repository, which permits the profile to be used and/or re-used at a subsequent time by the domain expert or another user. Further, typically the user will then perform a discovery process operation on one or more data and/or information sources using the profile, as shown at block 114. And when knowledge profiles are stored, such as to be shared in a knowledge repository, often the profile is not restricted to a particular one or more data sources, but permits the selection or choice of the one or more data sources that is analyzed with the profile to occur after selection of the profile for subsequent use.

Figure 5:
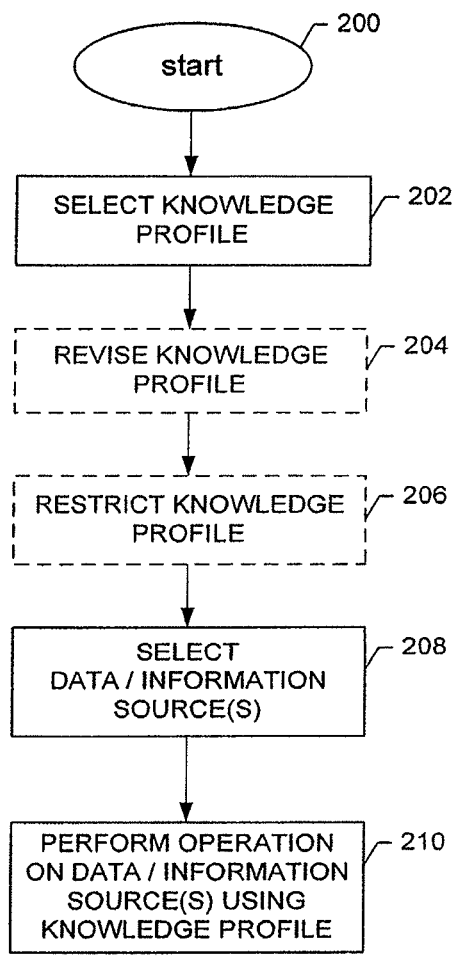
FIG. 5 is a flow diagram for using associative relevancy knowledge profiles generated according to an embodiment of the present invention.

FIG. 5 is a flow diagram for using associative relevancy knowledge profiles generated according to an embodiment of the present invention. A discovery process is identified as starting at block 200. A user selects or chooses a knowledge profile, as shown at block 202. Depending on the capabilities of the system and/or the rights of the user, the user may be able to revise the knowledge profile, as shown at block 204 or to further enhance or restrict the knowledge profile, as shown at block 206. The user also selects or chooses the data and/or information source or sources, as shown at block 208 that the user desires to run against the knowledge profile. And then the user is able to perform a discovery process operation upon the data and/or information source(s) using the knowledge profile, as shown at block 210. A discovery process may be a search, evaluation, or other analysis of the data source(s) based upon the knowledge and other user preferences built into the profile. And the results of a discovery process, or any other search, evaluation, or analysis operation may be used as a known reference set for creating another profile.

Figure 6:
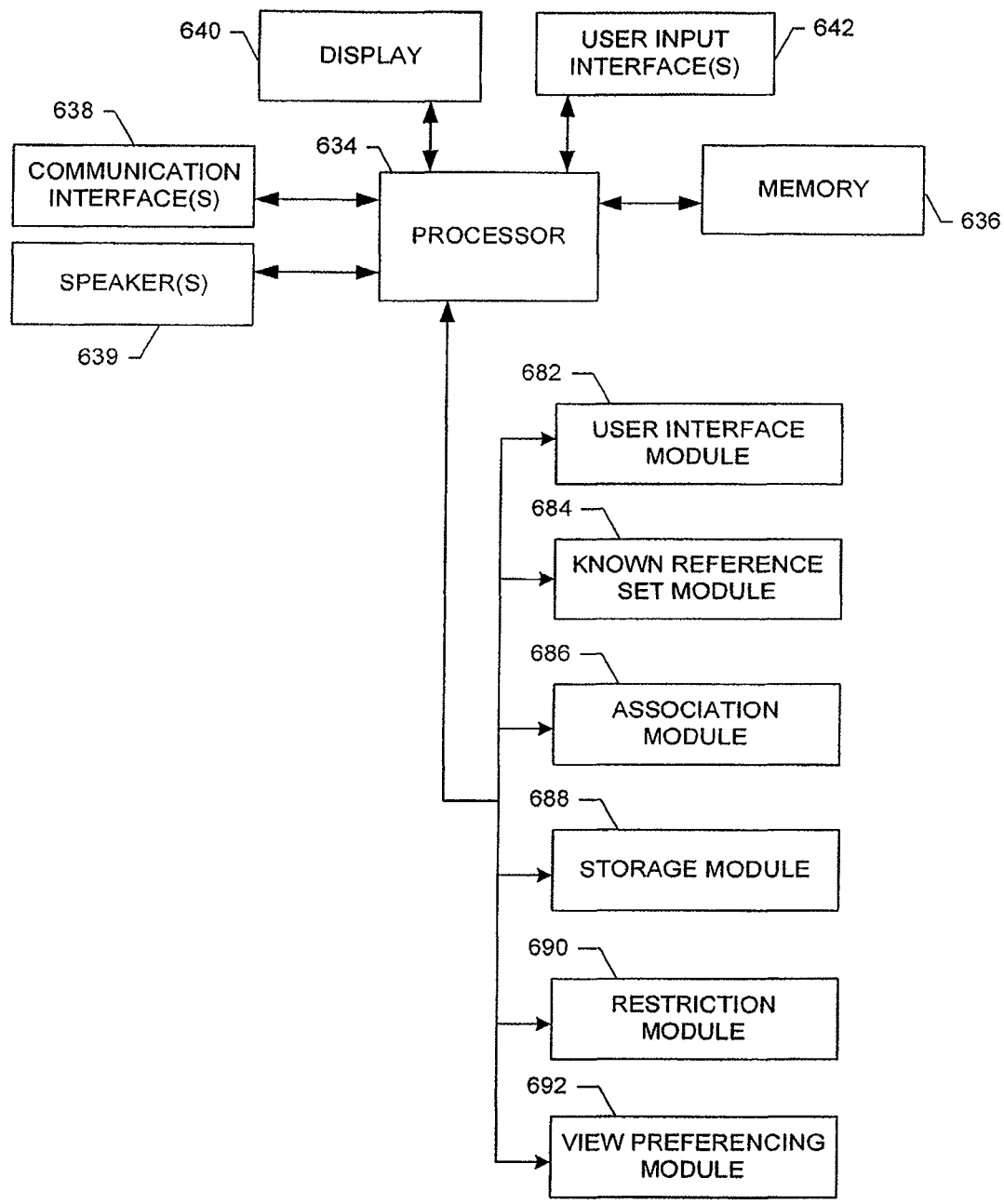
FIG. 6 is a schematic block diagram of an entity capable of operating as a computing system in accordance with an embodiment of the present invention.

FIG. 6 is a schematic block diagram of an entity capable of operating as a computing system in accordance with an embodiment of the present invention. Although shown as separate entities, such as in FIG. 1, in some embodiments, one or more entities may support one or more of a computing system, known reference set data source(s), data and/or information source(s), a profile database (knowledge repository), a user interface, and/or a search engine or inference engine, logically separated but co-located within the entit (ies). For example, a single entity may support a logically separate, but co-located, computing system and knowledge repository. Also, for example, a single entity may support a logically separate, but co-located computing system and search engine. The entity capable of operating at least as a computing system 22 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 6, the entity can include a processor, controller, or like processing element 634 connected to a memory 636. It is understood that the processor 634 may include the circuitry required for implementing the logic functions of a computing system 22 for an embodiment of the present invention. For example, the processor 634 may be comprised of a digital signal processor device, a microprocessor device, and various analog-to-digital converters, digital-to-analog converters, and other support circuits. The control and signal processing functions of a computing system may be allocated between these devices according to their respective capabilities. Further, the processor 634 may include the functionality to operate one or more software programs, which may be stored in memory 636.

The memory 636 can comprise volatile and/or non-volatile memory, and typically stores content, data or the like, either or both on a temporary basis or for a longer term and/or permanent basis. For example, the memory typically stores content created by, transmitted from, and/or received by, the entity. Also for example, the memory typically stores computer program code, such as for operating systems and client applications, for the processor to perform steps associated with operation of the entity in accordance with embodiments of the present invention. Memory 636 may be, for example, read only memory (ROM), random access memory (RAM), a flash drive, a hard drive, and/or other fixed data memory or storage device. For example, non-volatile memory may include a flash memory, or the like, such as available from the SanDisk Corporation of Sunnyvale, Calif., or Lexar Media Inc., of Fremont, Calif. The memories can store any of a number and amount of data and information, including known reference sets, profiles, and data sources.

As described herein, the computer program product module(s) and/or application(s) may each comprise software operated by the respective entities. It should be understood, however, that any one or more of the modules and applications described herein can alternatively comprise firmware or hardware, without departing from the spirit and scope of the present invention. Generally, then, a computing system may include one or more logic elements for performing various functions of one or more module(s) and/or application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective entity (i.e., computing system, known reference set data source(s), data and/or information source(s), a profile database (knowledge repository), a user interface, and/or a search engine or inference engine, etc.) or more particularly, for example, a processor 634 of the respective entity. The design of integrated circuits is by and large a highly automated process. In this regard, complex and powerful software tools are available for converting a logic level design into a semiconductor circuit design ready to be etched and formed on a semiconductor substrate. These software tools, such as those provided by Avant! Corporation of Fremont, Calif. and Cadence Design, of San Jose, Calif., automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 636, the processor 634 can also be connected to at least one interface or other means for displaying, transmitting and/or receiving data, content or the like. In this regard, the interface(s) can include at least one communication interface 638 or other means for transmitting and/or receiving data, content or the like. For example, the communication interface(s) may include a first communication interface for connecting to a first wireless connected entity and/or network and a second communication interface for connecting to a second wired connected entity and/or network. When an entity provides wireless communication to operate wirelessly with a connected entity or to operate in a wireless network, such as a Bluetooth network, a wireless network, or other mobile network, the processor 634 may operate with a wireless communication subsystem of the interface 638. In addition to the communication interface(s), the interface(s) can also include at least one user interface that can include one or more earphones and/or speakers 639, a display 640, and/or a user input interface 642. The user input interface, in turn, can comprise any of a number of devices allowing the entity to receive data from a user, such as a microphone, a keypad, a touch display, a joystick or other input device. One or more processors, memory, storage devices, and other computer elements may be used in common by a computer system and subsystems, as part of the same platform, or processors may be distributed between a computer system and subsystems, as parts of multiple platforms. It should be understood that an embodiment of a computing system of the present invention may include alternative means and/or additional supporting software and/or hardware for performing one or more like functions, without departing from the spirit and scope of the present invention. More particularly, for example, a wireless connection for communication interface 638 might include an antenna, a transmitter, a receiver, and a controller for the wireless operation.

If the entity is, for example, an associative relevancy knowledge profiling system, the entity may also include a user interface module 682, a known reference set module 684, an association module 686, a storage module 688, a restriction module 690, and a view preferencing module 692 connected to the processor 634. These modules may be software and/or software-hardware components, such as computer-readable program code portions stored on a computer-readable storage medium, and one or more modules may be combined into a single module. For example, a user interface module 682 may include software and/or software-hardware components capable of and configured to generate a user interface for presentation on a display screen and also to receive user input from a domain expert. A known reference set module 684 may include software and/or software-hardware components capable of and configured to provide at least two available known reference sets to the domain expert and to permit the selection of at least two known reference sets by the domain expert according to a selective user input of the domain expert received by, for example, the user interface module 682. A selective user input may be, for example, highlighting the identification (name) of a known reference set, selecting a radio button for a known reference set, checking a checkbox for a known reference set, or any similar means to indicate to the known reference set module 684 that the domain expert desires a particular known reference set to be used. A known reference set module 684 may also be capable of and configured to input at least one known reference set as one of the available known reference sets, such as to permit the domain expert to create a known reference set, to permit the domain expert to upload a file representing a known reference set, to retrieve a known reference set from memory, or a similar means to provide the contents of a known reference set to the known reference set module 684. Further, a known reference set module 684 may also be capable of and configured to identify the at least one known reference set input by the known reference set module 684, such as based upon an identifying user input of the domain expert received by, for example, the user interface module 682. Identifying user input may be, for example, selecting a known reference set such as a known reference set input by the known reference set module 684 from a list of available known reference sets, locating a known reference set on a local or network storage device, or any similar means to indicate for the known reference set module 684 that the domain expert desires a particular known reference set to be used with the profile.

An association module 686 may include software and/or software-hardware components capable of and configured to create an association between two of the available known reference sets according to an associative user input of the domain expert received by, for example, the user interface module 682. A created association may be, for example, semantic enrichment such as associating one or more elements of a first known reference set with one or more elements of a second known reference set; a cross map between two known reference sets; a table join between two known reference sets; one or more computational restrictions or like rules applied to one or more elements of a first known reference set and possibly also one or more elements of a second known reference set based upon one or more elements of the second known reference set and possibly also one or more elements of the first known reference set, respectively; a fixed, linear, or non-linear computational restriction/modification and/or numerical algorithm applied to one or more elements of a first known reference set and possibly also one or more elements of a second known reference set based upon one or more elements of the second known reference set and possibly also one or more elements of the first known reference set, respectively; or a similar means of associating two known reference sets that imparts an awareness or comprehension of the subject matter domain by a domain expert to permit the domain expert to formalize his or her own conclusions, theories, anticipations, interpretations, impressions, and other preconceived notions about the domain as represented by the known reference sets and the domain expert's association(s) between the known reference sets, thereby permitting the creating of a functional construct based upon the association(s). Similarly, a created association may be, for example, different from or in addition to an association creating a one-to-one correspondence linking between at least two components (two or more elements and/or two or more groups of elements) from two known reference sets, such as, in addition to or as an alternative to a cross map or table join, an association may be created that provides semantic enrichment of a first known reference set based upon one or more elements of a second known reference set. The association module 686 may be further capable of and configured to generate a knowledge construct based upon the association and the two available known reference sets of the association. Further, the association module 686 may be further capable of and configured to generate a profile comprising the association between the two available known reference sets of the association.

A storage module 688 may be capable of and configured to store a profile and to provide the profile for subsequent use. For example, a storage module 688 may be capable of and configured to store profiles generated by the association module 686 in one or more memories for temporary and/or more permanent storage and subsequent use. A storage module 688 may also be capable of and configured to store profiles that may be published and/or shared, maintained, and subsequently used as part of a knowledge repository.

A restriction module 690 may be capable of and configured to modify a profile to impose a restriction upon at least two known reference sets of an association of the profile, such as based upon a restricting user input of the domain expert received by, for example, the user interface module 682. A restricting user input may define a restriction that is, for example, a selection, a ranking, a filter, a semantic enrichment, a computational restriction, a fixed, linear, or non-linear computational restriction/modification and/or numerical algorithm.

A preferencing module 692, also referred to as a view preferencing module, may be capable of and configured to modify a profile to impose a viewing preference upon any use of the profile, such as based upon a preference user input of the domain expert received by, for example, the user interface module 682. A preference user input may define a viewing preference that is, for example, a ranking preference, a quantity preference, a content preference, or a filtering preference.

Similar other modules comprising software and/or software-hardware components may also be connected to the processor 634 including software capable of performing one or more of the additionally described functions and capabilities of an embodiment of the present invention and/or a system related to an embodiment of the present invention.

Embodiments of the present invention are described with reference to block diagrams and flowchart illustrations of methods, apparatus (and systems), and computer program products according to embodiments of the invention. In this regard, each block or step of a block diagram or flowchart, and combinations of blocks in a block diagram or flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block diagrams' and flowchart's block(s) or step(s).

Accordingly, blocks of the block diagrams and flowcharts support combinations of means for performing the specified functions, combinations of steps for performing the specified functions, and computer program instructions, such as embodied in computer-readable program code logic means, for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block diagrams' and flowchart's block(s) or step(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block diagrams' and flowchart's block(s) or step(s).

Provided herein are improved architectures, systems, methods, and computer program products that provide a user with the ability to define an association of data and/or information from known reference sets that is perceived by the user as relevant to a subject matter domain, thereby imparting and formalizing some of the user's knowledge about the domain. An associative relevancy knowledge profiler may also allow a user to create a profile by modifying or restricting the known reference sets and windowing the results from the association as a user might refine any other analysis algorithms and for related evaluation purposes. An associative relevancy knowledge profiler may also be used to define a user profile that can be used by the user and others. A user profile may be usable in various manners depending upon, for example, rights management permissions and restrictions for a user. Similarly, a user profile may be usable in various domains and/or with different data and information sources, such as those data sources available to a particular user.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A system for associative relevancy-based discovery, the system comprising:
    at least one user interface module configured to:
        receive selection of an associative relevancy knowledge profile, and
        receive selection of at least one data source to evaluate using the associative relevancy knowledge profile;
    a processor configured to cause performance of a discovery process operation upon the at least one data source using the associative relevancy knowledge profile;
    an association module configured to utilize results from the discovery process as a precompute data source for creating a new associative relevancy knowledge profile to form a multi-layered collection of associative relevancy knowledge profiles, the multi-layered collection of associative relevancy knowledge profiles comprising a plurality of domain expert association constructs among a plurality of known reference sets comprising ontologies, dictionaries, metadata, structures, and schemata, wherein the plurality of domain expert association constructs comprise: (i) new, domain expert associations among the plurality of known reference sets; and (ii) at least one viewing preference for presenting results from use of the associative relevancy knowledge profile; and
    a restriction module configured to restrict the associative relevancy knowledge profile by imposing restrictions upon the plurality of known reference sets of the associative relevancy knowledge profile, wherein the restrictions comprise computational modification, domain expert selection, and semantic enrichment restrictions.

2. The system of claim 1, further comprising:
    a preferencing module configured to modify the associative relevancy knowledge profile.

3. The system of claim 2, wherein the preferencing module is configured to modify the associative relevancy knowledge profile by modifying the plurality of known reference sets before the at least one domain expert association construct is created.

4. The system of claim 1,
    wherein the user interface module is further configured to receive user input defining the restrictions, and
    wherein the restriction module is further configured to restrict the associative relevancy knowledge profile based on the user input defining the restrictions.

5. The system of claim 1, wherein the computational modification restrictions comprise a computational restriction, a fixed numerical modification, a linear numerical computation, and a non-linear numerical computation.

6. The system of claim 1, wherein the discovery process comprises a search or evaluation of the at least one data source based upon the associative relevancy knowledge profile.

7. The system of claim 6, wherein the processor is further configured to:
    identify user preferences built into the associative relevancy knowledge profile; and
    cause performance of the discovery process based on the identified user preferences.

8. The system of claim 1, further comprising:
    the association module configured to store and curate the new associative relevancy knowledge profile in a knowledge repository accessible to a plurality of computing devices.

9. The system of claim 1, wherein the domain expert selection restrictions comprise a selection, a ranking, and a filter, or plurality thereof.

10. The system of claim 1, wherein the at least one domain expert association construct among the plurality of known reference sets imparts an awareness or comprehension of a subject matter domain by the domain expert.

11. The system of claim 1, wherein the processor is further configured to:
    apply a dynamic constraint comprising a variable numerical multiplier to bias a weighted importance of the plurality of known reference sets of the associative relevancy knowledge profile, and subsequently, the associative relevancy knowledge profile is adjusted to the bias.

12. A method for associative relevancy-based discovery, comprising:
    selecting an associative relevancy knowledge profile;
    selecting at least one data source to evaluate using the associative relevancy knowledge profile;
    performing a discovery process operation upon the at least one data source using the associative relevancy knowledge profile;
    utilizing results from the discovery process as a precompute data source for creating a new associative relevancy knowledge profile to form a multi-layered collection of associative relevancy knowledge profiles, the multi-layered collection of associative relevancy knowledge profiles comprising a plurality of domain expert association constructs among a plurality of known reference sets comprising ontologies, dictionaries, metadata, structures, and schemata, wherein the plurality of domain expert association constructs comprise: (i) new, domain expert associations among the plurality of known reference sets; and (ii) at least one viewing preference for presenting results from use of the associative relevancy knowledge profile; and
    restricting the associative relevancy knowledge profile by imposing restrictions upon the plurality of known reference sets of the associative relevancy knowledge profile, wherein the restrictions comprise computational modification, domain expert selection, and semantic enrichment restrictions.

13. The method of claim 12, further comprising:
    modifying the associative relevancy knowledge profile.

14. The method of claim 13, wherein modifying the associative relevancy knowledge profile:
    comprises modifying the plurality of known reference sets before the at least one domain expert association construct is created.

15. The method of claim 12, further comprising:
    receiving user input defining the restrictions,
    wherein restricting the associative relevancy knowledge profile is based on the user input defining the restrictions.

16. The method of claim 12, wherein the discovery process comprises a search or evaluation of the at least one data source based upon the associative relevancy knowledge profile.

17. The method of claim 12, further comprising storing and curating the new associative relevancy knowledge profile in a knowledge repository accessible to a plurality of computing devices.

18. A computer program product for associative relevancy-based discovery, the computer program product comprising at least one non-transitory computer-readable storage medium storing computer-readable program code portions that, when executed, cause an apparatus to:
  select an associative relevancy knowledge profile;
  select at least one data source to evaluate using the associative relevancy knowledge profile;
  perform a discovery process operation upon the at least one data source using the associative relevancy knowledge profile;
  utilize results from the discovery process as a precompute data source for creating a new associative relevancy knowledge profile to form a multi-layered collection of associative relevancy knowledge profiles, the multi-layered collection of associative relevancy knowledge profiles comprising a plurality of domain expert association constructs among a plurality of known reference sets comprising ontologies, dictionaries, metadata, structures, and schemata, wherein the plurality of domain expert association constructs comprise: (i) new, domain expert associations among the plurality of known reference sets; and (ii) at least one viewing preference for presenting results from use of the associative relevancy knowledge profile; and restrict the associative relevancy knowledge profile by imposing restrictions upon the plurality of known reference sets of the associative relevancy knowledge profile, wherein the restrictions comprise computational modification, domain expert selection, and semantic enrichment restrictions.

\* \* \* \* \*